US010155312B2

(12) United States Patent
Feldmann et al.

(10) Patent No.: US 10,155,312 B2
(45) Date of Patent: Dec. 18, 2018

(54) METHOD FOR DETERMINING VALUES INFLUENCING THE MOVEMENT OF A ROBOT

(71) Applicant: Daimler AG, Stuttgart (DE)

(72) Inventors: Anton Feldmann, Sindelfingen (DE);
Alexander Guertler, Besigheim (DE);
Simon Klumpp, Neuhausen (DE);
Willi Klumpp, Ostfildern (DE);
Matthias Reichenbach, Stuttgart (DE);
Matthias Schreiber, Bietigheim-Bissingen (DE); Michael Zuern, Sindelfingen (DE)

(73) Assignee: Daimler AG, Stuttgart (DE)

( * ) Notice: Subject to any disclaimer, the term of this patent is extended or adjusted under 35 U.S.C. 154(b) by 203 days.

(21) Appl. No.: 15/313,362

(22) PCT Filed: May 9, 2015

(86) PCT No.: PCT/EP2015/000964
§ 371 (c)(1),
(2) Date: Nov. 22, 2016

(87) PCT Pub. No.: WO2015/176802
PCT Pub. Date: Nov. 26, 2015

(65) Prior Publication Data
US 2017/0182663 A1  Jun. 29, 2017

(30) Foreign Application Priority Data
May 23, 2014  (DE) ..................... 10 2014 007 624.5

(51) Int. Cl.
*B25J 9/16* (2006.01)
(52) U.S. Cl.
CPC ... *B25J 9/1676* (2013.01); *G05B 2219/40202* (2013.01); *G05B 2219/40203* (2013.01);
(Continued)

(58) Field of Classification Search
CPC ...... B25J 9/0084; B25J 9/1605; B25J 9/1638; B25J 9/1664; B25J 9/1666; B25J 9/1671;
(Continued)

(56) References Cited

U.S. PATENT DOCUMENTS 8,700,307 B1   4/2014 Zhao et al.

FOREIGN PATENT DOCUMENTS

DE         103 20 343 A1    12/2004
DE   10 2007 037 077 A1     2/2009
(Continued)

OTHER PUBLICATIONS

PCT/EP2015/000964, International Search Report dated Aug. 13, 2015 (Two (2) pages).

*Primary Examiner* — Adam R Mott
(74) *Attorney, Agent, or Firm* — Crowell & Moring LLP

(57) ABSTRACT

A method for determining values influencing movement of a robot is disclosed. The method includes the following steps: a) provision of a task to be performed by the robot and a worker; b) provision of a layout of a workstation; c) provision of tool data; d) determination of respective axial movement patterns of the robot on the basis of steps a) to c); e) provision of a worker workspace; f) determination of critical path points of the robot, where a specified movement speed is exceeded by the robot and/or a specified mass of an element to be moved by the robot is exceeded, on the basis of the axial movement patterns and the workspace; g) simulation of respective collisions at the critical path points by a second robot; and h) determination of permissible operating speeds of the robot for each critical path point on the basis of the simulated collisions.

11 Claims, 3 Drawing Sheets

(52) U.S. Cl.
CPC .............. *G05B 2219/40317* (2013.01); *G05B 2219/40476* (2013.01)

(58) Field of Classification Search
CPC ................. B25J 9/1676; B25J 9/1682; G05B 2219/40198; G05B 2219/40201; G05B 2219/40202; G05B 2219/40203; G05B 2219/40317; G05B 2219/40476
See application file for complete search history.

(56) References Cited

FOREIGN PATENT DOCUMENTS

| | | |
|---|---|---|
| DE | 10 2013 212 887 A1 | 4/2014 |
| EP | 2 000 872 A2 | 12/2008 |

METHOD FOR DETERMINING VALUES INFLUENCING THE MOVEMENT OF A ROBOT

BACKGROUND AND SUMMARY OF THE INVENTION

The invention relates to a method for determining values influencing the movement of a robot, in particular to a method for planning and evaluating production plants that are operated in the sense of a human-robot collaboration.

When a human being and a robot are intended to work in close collaboration, it is important to know the risk posed to the person by the robot at all times.

There are currently approaches for assessing already existing plants in terms of the risk posed to humans, such as the calculation models or collision measurements in the production plant disclosed in DE 10 2013 212 887 A1. Accordingly, potential human and robot collision sites are identified and assessed in terms of their risk in accordance with specified standards (for example, ISO10218-1, ISO10218-2, TS 15066, BG/BGIA Recommendation for Risk Assessment According to the Machinery Directive—Designing of Workplaces with Collaborating Robots—U001/2009). If the risk is too high, appropriate adjustments are made to the movement or rather the path and/or to the speed of the robot. This is carried out in an iterative manner until all risks have been eliminated. These kinds of methods are not only very laborious but also require a physically existing facility or plant in every case. Furthermore, these methods only work if the robot dynamics model is precisely known, which is often not the case is in actual practice. Furthermore, the computer model must be set up anew and revalidated for every change in the hardware or software.

Because the collision behavior cannot be calculated exactly with these methods, the movements must be executed in perhaps extreme slow motion, which can lead to reduced cycle times. Furthermore, reproducibility or repeatability is difficult with measurements in the actual plant. Also, it is not possible to take measurements at each point in a given plant at the present time because the measurement systems used for taking measurements cannot be mounted on every site in a given plant on account of interfering contours.

The problem addressed by this invention is therefore that of providing a coherent approach by means of which the risk to a human being can be assessed in the planning, stage so that appropriate changes can also be made at this stage.

The method of the invention for determining values influencing the movement of a robot comprises the following steps:

a) Provision of a task to be performed by the robot and a worker;

b) Provision of a layout of a workstation in which the task shall be performed;

c) Provision of tool data that characterize a tool that the robot shall use in performing the task;

d) Determination of respective axial movement patterns, which are required for performing the task, of the robot on the basis of the information provided in the preceding steps;

e) Provision of a workspace for the worker;

f) Determination of relevant, in particular critical path points of the robot, in particular within the worker's workspace, at which a predefined movement speed will be exceeded by the robot and/or at which a predetermined mass of an element to be moved by means of the robot will be exceeded, on the basis of the axial movement patterns and the workspace;

g) Simulation of respective collisions at the path points by means of a second robot;

h) Determination of permissible operating speeds of the robot for any given, preferably critical path point on the basis of the simulated collisions.

The aforementioned problem is thus inventively solved in that the collision forces and surface pressures actually arising in the operation are determined with the aid of a test structure consisting of an industrial robot that simulates an unyielding impact in any given position of the workspace. In this manner the maximum operating speed can be determined for each point of the robot's trajectory during the planning stage. In contrast to the aforementioned prior art approach, an evaluation can thus be performed on the basis of all effects resulting from the robot movement.

These effects are primarily speeds, masses, geometries, distances, accessibility by body parts, the strategy used to control the movement, protective elements used, and material properties.

This approach is essential for determining whether a plant fulfills current BG recommendations and standards; i.e., whether there are any risks according to ISO 10218-2. With the method of the invention, a plant intended to be operated in the sense of a human-robot collaboration can be planned in a particularly rational manner. With the method of the invention, in particular it is possible to evaluate potential risks posed by the robot before constructing the actual plant.

An advantageous embodiment of the invention makes provision such that an enveloping space that surrounds the entire tool is established on the basis of the tool data. In other words, provision can be made of a so-called gripper envelope that takes the geometry of the tool concerned into account for possible collisions. This enveloping space is quickly and economically producible by means of, for example, a rapid prototyping process.

In another advantageous design of the invention, provision is made such that the axial movement patterns are determined by means of a simulation or a measurement. In the case of a simulation, the advantage lies in that the robot concerned does not need to be operated at all. The advantage of a measurement lies in that more precise axial movement patterns could be determined than with a simulation.

The simulation can be performed with a so-called office PC or with an RCS module or with any other path-accurate simulation option. This approach is particularly necessary in cases where the process has to be used in a tendering or planning phase.

According to another advantageous embodiment of the invention, provision is made such that potential crushing or pinning points, particularly within the worker's workspace, are determined on the basis of the axial movement patterns, at which points respective minimum distances between the production plant and the robot, as standardized in DIN EN 349, are not maintained. Potential risks posed to the worker while carrying out the specified work order can thus be determined at an early stage.

It is thus possible to depict the states of the robot in which security measures are required to protect all relevant body parts from pinning/crushing hazards as well as the states in which security measures are required to protect all relevant body parts from impact hazards.

Another advantageous embodiment of the invention makes provision such that a temporal progression of the reflected masses of the robot is determined. A reflected mass, a.k.a. a load mass, is the perceived mass of a module on a motor drive shaft of a drive motor; in this case the respective mass perceived on the axes of the robot. The actual masses to which the robot or worker will be subjected can thus be determined in a relatively reliable manner.

The mass/inertia properties of the robot and its limbs as well as the tool/workpiece properties are factored into the mass calculations.

In another advantageous design of the invention, provision is made such that the collisions simulated by means of the second robot are iteratively repeated by means of a pendulum and a load cell with different operating speeds until corresponding collision forces, collision pressures, and surface pressures are no longer reaching respective threshold values at the critical path points. Biomechanical load limits, which are specified by corresponding standards, for example, can thus be determined in a particularly reliable manner. In other words, so-called biofidelic load limits can be monitored and the corresponding operating speeds of the robot can be iteratively adjusted until accordingly specified threshold values are no longer being exceeded. Another advantageous embodiment of the invention makes provision such that a biofidelic test piece according to BG/BGIA recommendations is used as a mechanism for measuring force or pressure. Thus the biomechanics can thus also be depicted upon the impact of the robot and the test piece with each other.

The measurement of force and surface pressure could also be carried out on a process-steady measurement setup and by converting the recorded force progression to a progression that would have arisen on any spring-damper model. The conversion to the spring-damper models would advantageously be as specified in the standards for the various body parts.

Lastly, in another advantageous design of the invention provision is made such that for determining the respective collisions, the second robot is set in such a way that it simulates corresponding impact directions and resistances for the critical path points. Essentially any impact incidents can thus be simulated in a particularly precise, reproducible, and verifiable manner without any hardware modification.

Since the biomechanical load limits will also be exceeded in the effective direction of relevant geometries on the tool, there is a risk of impacts and pinning in this direction as well.

Other advantages, features, and details of the invention will emerge from the following description of a preferred exemplary embodiment and by referring to the drawings. The features and feature combinations mentioned in the preceding description as well as the features and feature combinations mentioned in the following description of the figures and/or shown in just the figures can not only be used in each specified combination but also in other combinations or by themselves, without exceeding the scope of the invention.

DETAILED DESCRIPTION OF THE DRAWINGS

Figure 1:
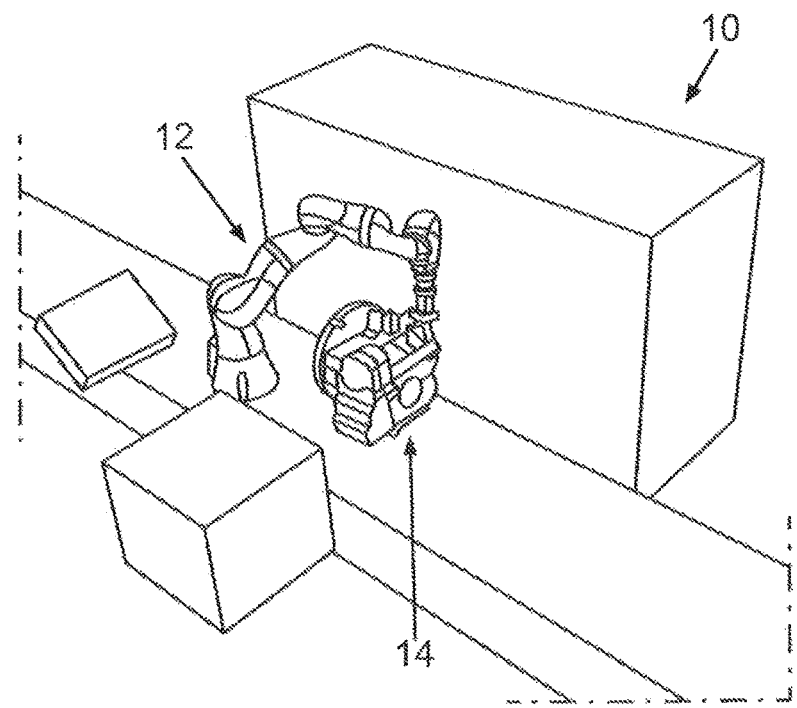
FIG. 1 shows a schematic, perspective view of a layout of a workstation in which a specified task is performed collaboratively by a lightweight robot and a worker, who is not illustrated in this figure.

A layout of a workstation 10 is shown in a perspective view in FIG. 1. The layout of the workstation 10 can be provided as, for example, a CAD model for a planned station and its surroundings. A lightweight robot 12, which performs a specified task on a workpiece 14, is arranged in the workstation 10.

The workstation serves as a so-called HRC plant, this abbreviation standing for human-robot collaboration. In the plant 10 shown here, this means that a worker (who is not illustrated here) and the lightweight robot 12 collaboratively perform a specified task on the workpiece 14 shown here.

Figure 2:
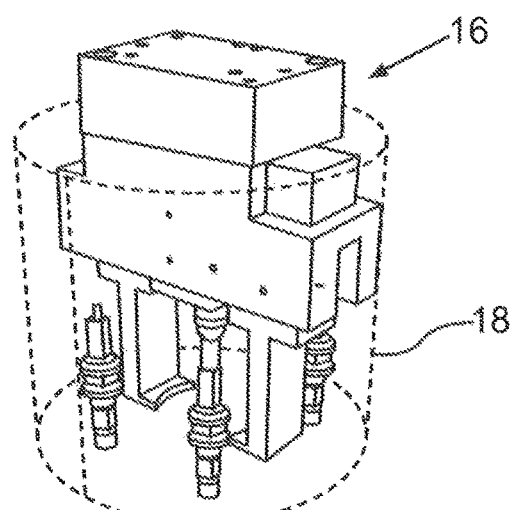
FIG. 2 shows a perspective view of a tool used by the lightweight robot shown in FIG. 1 to perform the specified task.

FIG. 2 shows a perspective view of a tool 16 that the lightweight robot 12 will use for performing the aforesaid task. An enveloping space 18 that surrounds the tool 16 is established around the tool 18. A gripper not designated in any further detail has a mass of, for example, ca. 1.2 kilograms, wherein the mass of the workpiece 14 is ca. 10 kilograms. A type of gripper envelope that takes corresponding geometries into account for possible collisions is provided by the enveloping space 18.

Figure 3:
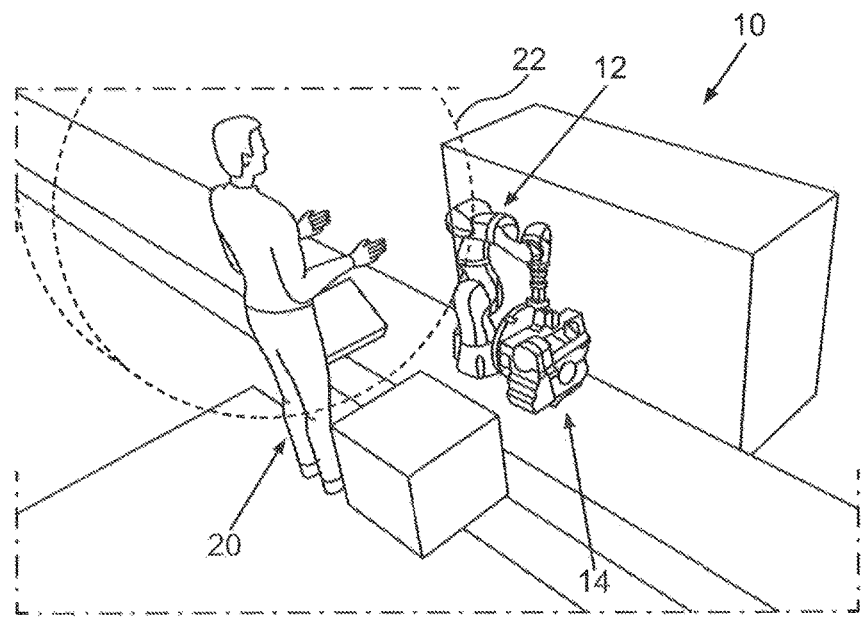
FIG. 3 shows another perspective view of the workstation, wherein the worker, who is to perform the specified task in collaboration with the lightweight robot, and a workspace of the worker are illustrated.

In FIG. 3, the layout of the workstation 10 is illustrated again in another perspective view, wherein in this case the worker 20, who is to perform an accordingly specified task on the workpiece 14 in collaboration with the lightweight robot 12, is now illustrated. Furthermore, a workspace 22 of the worker 20 is illustrated around the worker 20. This depicts the workspace of a 95 percentile person.

Provision is therefore made of the task to be performed by the lightweight robot 12 and the worker 20, as well as of the layout of the workstation 10 in which the task is to be performed. Further provision is made of corresponding tool data (e.g., mass, geometry, and the like) for the tool 16 that the lightweight robot 12 will use for performing the task. If this data is not available, contours as well as load data (masses and centers of gravity) estimated by abstraction will be used.

Respective axial movement patterns of the lightweight robot 12 that are required for performing the task can be determined on the basis of this information. This can be achieved, for example, either with a pure simulation or with a corresponding measurement. All robot positions necessary for performing the task can thus be determined beforehand. For example, the axial movement patterns acquired in this manner can be exported and used to provide target points and different axis positions of the lightweight robot 12. The target positions and corresponding tool data can be transformed in a robot control interface, after which a program relating thereto can be run, wherein corresponding axis values can be logged. This can take place on a simulation system as well as on an actual robot.

The so-called reflected mass can then be determined, this determination providing a theoretical progression of the reflected mass over time. This serves as an indicator for large masses in particular that act on the lightweight robot 12 or, in the event of an impact with the worker 20, on the worker 20.

Critical path points of the lightweight robot 12 are determined within the workspace 22 of the worker 20 in particular, at which points a predetermined movement speed is exceeded by the lightweight robot 12 or a predetermined mass of an element to be moved by means of the robot 12 (in this case the tool 16 plus the workpiece 14) is exceeded, wherein the previously determined axial movement patterns and the specified workspace 22 are taken into account. On the basis of the axial movement patterns, it is furthermore possible to determine potential crushing or pinning points, in particular within the workspace 22 of the worker 20, where respective minimum distances between the workstation 10 and the lightweight robot 12 as well as its tool geometries or the workpiece geometries are not maintained.

Furthermore, the tool and workpiece geometries relevant to a collision (i.e., sharp edges and chamfered corners, for example), as well as any collision detection and avoidance strategies that may be in place or in use, can and should be taken into account.

Critical path points are identified as such and selected in the event that particularly high speeds, large masses, and large momentums resulting therefrom arise.

The geometries on the tool or workpiece that are relevant to a collision, whether pinning or impacts are involved, and which body parts are at risk must also be factored into the calculation of the critical path points.

In this process, zones that do not lie within the workspace 22 of the worker 20 can be masked or not considered. In a particularly precise embodiment, the movement of the robot 12 can be broken down into individual points at intervals of a few milliseconds. Each single resulting point can then be selected and made safe accordingly.

Figure 4:
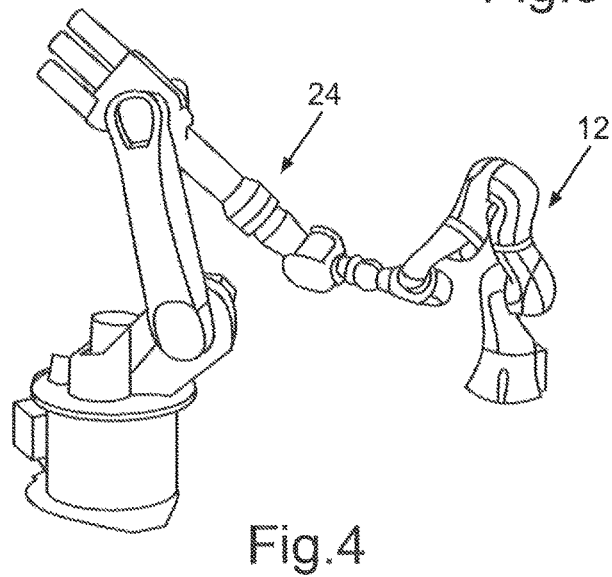
FIG. 4 is an illustration of an industrial robot, which is coupled to the lightweight robot shown in the preceding figures for simulating various impact scenarios.

The lightweight robot 12 and another industrial robot 24 are shown in FIG. 4. The industrial robot 24 serves as a flexible collision station, by means of which any number of impact scenarios can be simulated with variable tool loads. In other words, a test setup consisting of the industrial robot 24 equipped with a force measurement sensor system is used with the lightweight robot 12. In this process, the industrial robot 24 can be operated in the space in a flexible manner and set in such a way that it can precisely simulate respective impact directions and corresponding resistances in the case of an impact. The setup shown here is a physical construction, but in principle could be integrated in a digital process.

The simulation described above is dependent on the trajectory, in other words the movement path of the robot, the tools/workpieces being manipulated, the type of robot used, and the collision detection and avoidance strategies employed.

For the path points of the lightweight robot 12 determined as critical beforehand, or if necessary for all points of the path, respective collisions are thus simulated by means of the industrial robot 24, which is coupled with the lightweight robot 12. In this process, respective collision vectors are determined for the appropriate collision points corresponding to the critical path points. In doing so, the industrial robot 24 embodies an impact of the lightweight robot 12 against a wall.

In this simulation of collisions, the robot doing the impacting can be interchanged if investigations need to be performed for a certain type of robot, a certain software status, or for a certain hardware status.

Figure 5:
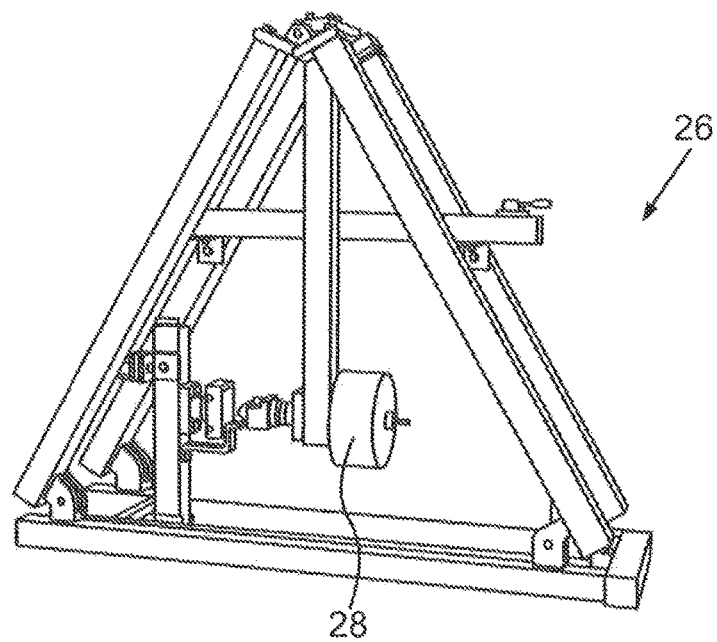
FIG. 5 shows a pendulum with a load cell by means of which collisions between the worker and the robot can be simulated.

FIG. 5 shows a perspective view of a pendulum 26, which has a load cell 28. After performing respective impacts by means of the test setup shown in FIG. 4, which comprises the industrial robot 24 and the lightweight robot 12, respective impacts are translated by the pendulum 26 shown here to the load cell 28. The mass of the pendulum 26 can be varied so that the actual tool mass can be simulated exactly. The pendulum can always be deflected to a sufficient degree so that it acts on the load cell 28 with the same speed that was simulated previously by means of the industrial robot 24, as shown in FIG. 4.

The collisions simulated by means of the industrial robot 24 are therefore iteratively repeated by means of the pendulum 26 and the load cell 28 with different operating speeds (i.e., different deflections of the pendulum 26) until corresponding collision forces, collision pressures, and surface pressures no longer reach the respective threshold values for each of the critical path points.

Figure 6:
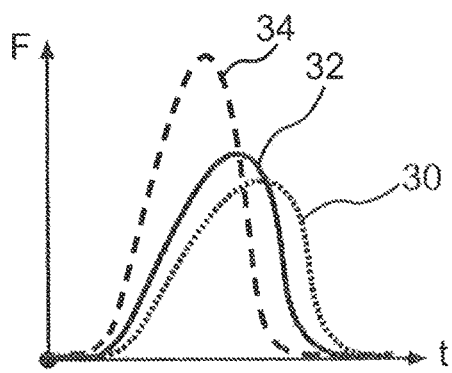
FIG. 6 is a schematic illustration of different force-time progressions arising from the simulation of collisions by means of the industrial robot and the pendulum.

Different force-time progressions are plotted in a schematic diagram in FIG. 6. The line 30 shows an example force-time progression that would arise from an actual impact of the lightweight robot 12 on the load cell 28. Also shown are other force-path progressions 32, 34 arising from the use of the pendulum 26. Different biofidelic load limits will result, depending on what kind of collisions are simulated with, for example, different body parts of the worker 20. The deflection of the pendulum 26 is iteratively repeated for the simulation of the respective collisions of each of the path points ranked as critical until biofidelic load limits are no longer reached in each case.

Ultimately it is thus possible to determine actual collision forces and collision pressures for respective path points ranked as critical, or every point on the path of the lightweight robot 12 in minimum distances. Furthermore, permissible operating speeds for each of the path points of the lightweight robot 12 deemed as critical are determined.

These are determined on the basis of all relevant geometries (corners, edges, etc.) on the tool and the workpiece.

Information on the respective speeds, masses, and the momentums resulting therefrom is thus available for each of the critical path points. Accordingly, forces and surface pressures arising in each case can be evaluated and then checked for compliance with current standards. Should this not be the case, corresponding operating speeds can be varied until these standards are fulfilled. Thresholds (pain thresholds, injury thresholds) introduced at a later date could also be taken into account. The collision strategies, parameters, and zero space and orientation positions could likewise be varied and thus optimally adjusted in this process step.

In an advantageous configuration, impact effects can be simulated by using suitable impact elements (foam materials or the like) and critical path points can then be padded and documented as optimization recommendations. Functions for correcting free body impact to restrained impact (see IFF Study, TS 15066), etc., can also be considered.

The determination of critical path points described above requires expert knowledge to some extent. If such knowledge is not available or if the most reliable approach possible is desired, a sequential testing of a path is recommended, in which the process is broken down into incremental partial points and each of these points is tested. The advantages of this method lie in comprehensive testing, which can then also be documented, as well as in complete transparency. Furthermore, because the fully automated configuration does not give rise to any expense or effort, this testing does not entail any significant additional expense or effort versus the testing of just the path points deemed critical.

There are diverse application possibilities for the methodology described above: on the one hand, it has applications in the tendering and planning phase of a plant, it can serve as a support for the developers of such plants, as an aid in plant project planning, for example to carry out a cycle time optimization at an early stage in the plant planning.

Furthermore, the methodology has applications in the startup, acceptance, and release as well as in the CE approval of a plant. In the event that adjustments and optimizations are being made to existing plants, such adjustments and optimizations can then be reevaluated with the method. During the operation time of a plant, maintenance measures, corrective measures, and further process optimization measures can be carried out in this manner. The methodology described herein can be used in an advantageous manner in the event of plant modifications such as expansions due to new variants or series, new technologies, materials, tools, or the like.

This methodology can furthermore be used when normative framework conditions change, for instance if the permissible collision forces or collision pressures or body models change.

The invention claimed is:

1. A method for determining values influencing a movement of a robot, comprising the steps of:
   a) providing a task to be performed by a first robot and a worker;
   b) providing a layout of a workstation in which the task is to be performed;
   c) providing tool data that characterize a tool to be used by the first robot in performing the task;
   d) determining axial movement patterns, which are required for performing the task, of the first robot on a basis of information provided in steps a) to c);
   e) providing a workspace of the worker;
   f) determining critical path points of the first robot where a specified movement speed is exceeded by the first robot and/or a specified mass of an element to be moved by the first robot is exceeded on a basis of the determined axial movement patterns and the workspace;
   g) simulating, via a second robot coupled with the first robot, respective collisions of the first robot at the critical path points; and
   h) determining permissible operating speeds of the first robot for any given path point on a basis of the simulated respective collisions.

2. The method according to claim 1, wherein an enveloping space that surrounds the tool is established on a basis of the tool data.

3. The method according to claim 1, wherein the axial movement patterns are determined by a simulation or a measurement.

4. The method according to claim 1, wherein potential crushing or pinning sites where respective minimum distances between the workstation and the first robot are not maintained are determined on a basis of the axial movement patterns.

5. The method according to claim 1, wherein a temporal progression of reflected masses of the first robot is determined from actual robot impacts.

6. The method according to claim 1, wherein the simulated respective collisions are iteratively repeated with different operating speeds by a pendulum and a load cell until corresponding collision forces, collision pressures, and surface pressures no longer reach respective thresholds for the critical path points.

7. The method according to claim 1, wherein for the step of simulating the respective collisions, the second robot simulates corresponding impact directions and resistances for the critical path points.

8. The method according to claim 1, wherein for the step of simulating the respective collisions, the second robot is equipped with a force measurement system.

9. The method according to claim 1, wherein parameters of impact speed, impact mass and/or contact geometry of the first robot are modified in an automatic iterative process until respective specified limit values are no longer reached.

10. The method according to claim 1, wherein the critical path points are within the workspace of the worker.

11. The method according to claim 1 further comprising the step of:
   i) operating the first robot in accordance with the determined permissible operating speeds in performing the task.

* * * * *